United States Patent
Kibune et al.

(10) Patent No.: US 10,601,029 B2
(45) Date of Patent: Mar. 24, 2020

(54) POSITIVE ELECTRODE FOR NONAQUEOUS ELECTROLYTE SECONDARY BATTERY AND NONAQUEOUS ELECTROLYTE SECONDARY BATTERY USING THE SAME

(71) Applicant: Sanyo Electric Co., Ltd., Daito-shi, Osaka (JP)

(72) Inventors: Kenji Kibune, Hyogo (JP); Fumiharu Niina, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 382 days.

(21) Appl. No.: 15/503,509

(22) PCT Filed: Aug. 25, 2015

(86) PCT No.: PCT/JP2015/004238
§ 371 (c)(1),
(2) Date: Feb. 13, 2017

(87) PCT Pub. No.: WO2016/051653
PCT Pub. Date: Apr. 7, 2016

(65) Prior Publication Data
US 2017/0194628 A1  Jul. 6, 2017

(30) Foreign Application Priority Data
Sep. 30, 2014  (JP) ................. 2014-200324

(51) Int. Cl.
*H01M 4/36* (2006.01)
*H01M 4/131* (2010.01)
(Continued)

(52) U.S. Cl.
CPC ............ *H01M 4/131* (2013.01); *H01M 4/36* (2013.01); *H01M 4/362* (2013.01); *H01M 4/364* (2013.01);
(Continued)

(58) Field of Classification Search
None
See application file for complete search history.

(56) References Cited

U.S. PATENT DOCUMENTS

2003/0134200 A1   7/2003   Tanaka et al.
2005/0227147 A1   10/2005  Kogetsu et al.
(Continued)

FOREIGN PATENT DOCUMENTS

| CN | 103956480 A | 7/2014 |
| JP | 2002-203558 A | 7/2002 |

(Continued)

OTHER PUBLICATIONS

Suzuki et al., Google Patents Machine Translation of JP 2002203558, Jul. 19, 2002 (Year: 2002).*

(Continued)

*Primary Examiner* — Jonathan G Leong
*Assistant Examiner* — Kirsten B Tysl
(74) *Attorney, Agent, or Firm* — Westerman, Hattori, Daniels & Adrian, LLP (57) ABSTRACT

It is an object to provide a positive electrode for nonaqueous electrolyte secondary batteries in which a decrease in the initial charge capacity is suppressed even when a positive electrode active material exposed to the air is used. The positive electrode for a nonaqueous electrolyte secondary battery contains a lithium transition metal oxide and is formed by mixing the lithium transition metal oxide, tungsten oxide, and a carbonate compound. The tungsten oxide is present on at least a part of a surface of the lithium transition metal oxide, and the mixed carbonate compound is present on a part of a surface of the tungsten oxide.

10 Claims, 2 Drawing Sheets

(51) Int. Cl.
  *H01M 4/505* (2010.01)
  *H01M 4/525* (2010.01)
  *H01M 4/62* (2006.01)
  *H01M 10/0525* (2010.01)
  *H01M 10/052* (2010.01)
  *H01M 4/02* (2006.01)

(52) U.S. Cl.
  CPC .......... *H01M 4/505* (2013.01); *H01M 4/525* (2013.01); *H01M 4/62* (2013.01); *H01M 4/623* (2013.01); *H01M 4/625* (2013.01); *H01M 10/0525* (2013.01); *H01M 4/366* (2013.01); *H01M 10/052* (2013.01); *H01M 2004/028* (2013.01)

(56) References Cited

U.S. PATENT DOCUMENTS

| | | | |
|---|---|---|---|
| 2006/0093914 | A1 | 5/2006 | Tanaka et al. |
| 2007/0054192 | A1 | 3/2007 | Koga et al. |
| 2009/0087739 | A1 | 4/2009 | Takahashi |
| 2009/0202905 | A1* | 8/2009 | Morita .................. H01M 4/131 429/212 |
| 2010/0028768 | A1* | 2/2010 | Morita ................ H01M 2/1653 429/144 |
| 2011/0003200 | A1 | 1/2011 | Shizuka et al. |
| 2013/0330615 | A1 | 12/2013 | Morita et al. |
| 2015/0221933 | A1 | 8/2015 | Mizawa et al. |

FOREIGN PATENT DOCUMENTS

| | | |
|---|---|---|
| JP | 2005-320184 A | 11/2005 |
| WO | 2007/086289 A1 | 8/2007 |
| WO | 2012/111116 A1 | 8/2012 |
| WO | 2014/049964 A1 | 4/2014 |

OTHER PUBLICATIONS

English translation of Search Report dated Oct. 26, 2018, issued in counterpart Chinese Application No. 201580051096.7. (2 pages).
International Search Report dated Nov. 17, 2015, issued in counterpart International Application No. PCT/JP2015/004238 (2 pages).

* cited by examiner

POSITIVE ELECTRODE FOR NONAQUEOUS ELECTROLYTE SECONDARY BATTERY AND NONAQUEOUS ELECTROLYTE SECONDARY BATTERY USING THE SAME

TECHNICAL FIELD

The present invention relates to a positive electrode for nonaqueous electrolyte secondary batteries and a nonaqueous electrolyte secondary battery using the positive electrode.

BACKGROUND ART

With the recent accelerated reduction in the size and weight of mobile information terminals such as cellular phones, notebook computers, and smartphones, secondary batteries serving as driving power supplies for such mobile information terminals have been required to have a higher capacity. Nonaqueous electrolyte secondary batteries, which are charged and discharged by the movement of lithium ions between positive and negative electrodes, have a high energy density and a high capacity and therefore are widely used as driving power supplies for the above mobile information terminals.

Furthermore, nonaqueous electrolyte secondary batteries have recently attracted attention as power supplies for driving, for example, power tools, electric vehicles (EVs), and hybrid electric vehicles (HEVs, PHEVs) and are promising for various uses.

Such power supplies for driving are required to have a higher capacity that allows long-term operation and improved output characteristics in the case where charge and discharge are repeatedly performed with a large current within a relatively short time. A higher capacity needs to be achieved while output characteristics during charge and discharge with a large current are maintained.

For example, PTL 1 proposes a positive electrode active material containing lithium carbonate as means for improving high-temperature storage characteristics and load characteristics. PTL 2 proposes a lithium manganese oxide modified with an oxide containing tungsten as means for maintaining a high discharge capacity during discharge with a large current.

CITATION LIST

Patent Literature

PTL 1: Japanese Published Unexamined Patent Application No. 2002-203558
PTL 2: Japanese Published Unexamined Patent Application No. 2005-320184

SUMMARY OF INVENTION

Technical Problem

However, the use of the techniques disclosed in PTL 1 and PTL 2 still poses a problem in that a decrease in the initial charge capacity cannot be suppressed when, the positive electrode active material is exposed to the air.

The degradation of the characteristics due to air exposure results from a LiOH reaction. Specifically, Li in a surface layer of the lithium transition metal oxide is replaced with hydrogen through a reaction of moisture present on the surface of the lithium transition metal oxide with the lithium transition metal oxide. Thus, Li is extracted from the lithium transition metal oxide and LiOH is produced, which degrades the characteristics.

If has been known that a decrease in the initial charge capacity due to air exposure is suppressed by adding tungsten oxide to a positive electrode active material. However, the effect is insufficient and the decrease in the initial charge capacity still remains as a problem.

Solution to Problem

Accordingly, it is an object of the present invention to provide a positive electrode for nonaqueous electrolyte secondary batteries in which a decrease in the initial charge capacity is suppressed even when a positive electrode active material exposed to the air is used, and a nonaqueous electrolyte secondary battery using the positive electrode.

According to the present invention, a positive electrode for a nonaqueous electrolyte secondary battery contains a lithium transition metal oxide and is formed by mixing the lithium transition metal oxide, tungsten oxide, and a carbonate compound. The tungsten oxide is present on at least a part of a surface of the lithium transition metal oxide, and the mixed carbonate compound is present on a part of a surface of the tungsten oxide.

Advantageous Effects of Invention

According to the present invention, there can be provided a positive electrode for nonaqueous electrolyte secondary batteries in which a decrease in the initial charge capacity is suppressed even when a positive electrode active material exposed to the air is used, and a nonaqueous electrolyte secondary battery.

DESCRIPTION OF EMBODIMENTS

An embodiment of the present invention will be described below. The embodiment is merely an example for carrying out the present invention, and the present invention is not limited to the embodiment.

[Positive Electrode]

In the present invention, tungsten oxide is present on at least a part of a surface of a lithium transition metal oxide, and a carbonate compound mixed in a positive electrode is in contact with a part of a surface of the tungsten oxide so as to form an interface between the carbonate compound and the tungsten oxide.

The interface is located away from near the surface of the lithium transition metal oxide and preferentially adsorbs moisture in the air. This makes it difficult to cause a LiOH production reaction on the surface of the lithium transition metal oxide, and thus the degradation of the charge capacity is suppressed.

The amount of the carbonate compound mixed in the positive electrode is preferably 0.5 mass % or more and 5 mass % or less relative to the lithium transition metal oxide. If the amount of the carbonate compound mixed in the positive electrode is less than 0.5 mass %, the amount of the interface between the tungsten oxide and the carbonate compound mixed in the positive electrode decreases, and therefore moisture is not sufficiently adsorbed at the interface. Consequently, the LiOH production reaction is not sufficiently suppressed on the surface of the lithium transition metal oxide, which decreases an effect of suppressing the degradation of the charge capacity.

If the amount of the carbonate compound mixed in the positive electrode is more than 5 mass %, the amount of the positive electrode active material decreases, which undesirably decreases the capacity of the positive electrode.

Any carbonate compound may be mixed, but the carbonate compound is preferably lithium carbonate, lithium dihydrogen carbonate, cobalt carbonate, nickel carbonate, manganese carbonate, potassium carbonate, or ammonium dihydrogen carbonate and particularly preferably lithium carbonate.

The particle size of the carbonate compound is preferably smaller than the particle size of the lithium transition metal oxide and particularly preferably smaller than or equal to 25% of the particle size of the lithium transition metal oxide. The particle size of the lithium transition metal oxide is determined by calculating the volume-average particle size by a laser diffraction method. The particle size of the carbonate compound is determined as follows.

One hundred particles of the carbonate compound observed with a scanning electron microscope (SEM) are randomly sampled. The lengths of the major axis and minor axis of the particles are measured, and the average of the lengths is defined as the particle size of the carbonate compound. In the case where the carbonate compound is present in the form of an aggregate, the particle size is a particle size of particles which are the smallest unit for the aggregate.

If the particle size of the carbonate compound is larger than the particle size of the lithium transition metal oxide, the carbonate compound is poorly dispersed in the positive electrode, and thus the contact area between the tungsten oxide and the carbonate compound mixed in the positive electrode decreases. Consequently, the interface between the tungsten oxide and the carbonate compound mixed in the positive electrode is not sufficiently formed, and the LiOH production reaction caused by moisture in the air easily occurs on the surface of the lithium transition metal oxide. Thus, the effect of suppressing the degradation of the charge capacity decreases.

The carbonate compound is mixed in the positive electrode by a method in which the lithium transition metal oxide and the carbonate compound are caused to adhere to each other by being mechanically mixed in advance or a method in which the carbonate compound is added in the process of kneading a conductive agent and a binding agent.

The carbonate compound is classified into a carbonate compound mixed in the positive electrode and a lithium carbonate inevitably contained in the lithium transition metal oxide. The inevitable lithium carbonate includes a lithium carbonate that is used as a raw material in the production of the lithium transition metal oxide and still remains on the surface of the lithium transition metal oxide after the production, and a lithium carbonate produced through a reaction with carbonic acid gas in an atmosphere gas in or after the production of the lithium transition metal oxide.

The amount of the carbonate compound mixed in the positive electrode is preferably 50 mass % or more and more preferably 75 mass % or more of the carbonate compound contained in the positive electrode.

The reason for this is as follows. If the amount of the carbonate compound mixed is smaller than the amount of the inevitable lithium carbonate present on the surface of the lithium transition metal oxide, moisture in the air is adsorbed to the interface between the tungsten oxide and the inevitable lithium carbonate present on the surface of the lithium transition metal oxide. Consequently, the LiOH production reaction easily occurs because of the adsorbed moisture.

The state in which the tungsten oxide is present on at least a part of the surface of the lithium transition metal oxide is a state in which the tungsten oxide adheres to the surface of the lithium transition metal oxide and preferably adheres to the surface in a uniformly scattered manner. The tungsten oxide contained in the positive electrode is not particularly limited, but is preferably $WO_3$ because tungsten has a most stable oxidation number of 6.

If the amount of the tungsten oxide is small, the amount of the interface formed as a result of contact between the tungsten oxide and the carbonate compound decreases. That is, since the amount of moisture in the air adsorbed to the interface decreases, moisture not adsorbed and the lithium transition metal oxide easily cause the LiOH production reaction. This decreases the effect of suppressing the degradation of the charge capacity of batteries.

If the amount of the tungsten oxide is excessively large, the surface of the lithium transition metal oxide is widely covered with the tungsten oxide (the number of covered portions increases). This degrades the charge-discharge characteristics of batteries.

Accordingly, the content of the tungsten oxide in the positive electrode active material is preferably 0.05 mol % or more and 10 mol % or less, more preferably 0.1 mol % or more and 5 mol % or less, and further preferably 0.2 mol % or more and 3 mol % or less relative to transition metals of the lithium transition metal oxide.

The positive electrode containing tungsten oxide is produced by a method in which the lithium transition metal oxide and tungsten oxide are caused to adhere to each other by being mechanically mixed in advance or a method in which tungsten oxide is added in the process of kneading a conductive agent and a binding agent.

The particle size of the tungsten oxide is preferably smaller than the particle size of the lithium transition metal oxide and more preferably smaller than or equal to 25% of the particle size of the lithium transition metal oxide. The particle size of the tungsten oxide is determined as follows.

One hundred particles of the tungsten oxide observed with a scanning electron microscope (SEM) are randomly sampled. The lengths of the major axis and minor axis of the particles are measured, and the average of the lengths is defined as the particle size of the tungsten oxide. In the case where the tungsten oxide is present in the form of an aggregate, the particle size is a particle size of particles which are the smallest unit for the aggregate.

If the particle size of the tungsten oxide is larger than the particle size of the lithium transition metal oxide, the tungsten oxide is poorly dispersed in the positive electrode, which decreases the contact area between the tungsten oxide and the carbonate compound mixed in the positive electrode. Consequently, the interface between the tungsten oxide and the carbonate compound mixed in the positive electrode is not sufficiently formed, and the LiOH production reaction caused by moisture in the air easily occurs on the surface of the lithium transition metal oxide. Thus, the effect of suppressing the degradation of the charge capacity decreases.

The positive electrode for nonaqueous electrolyte secondary batteries according to an embodiment of the present invention is preferably represented by general formula $Li_{1+x}M_aO_{2+b}$ (in the formula, x, a, and b satisfy x+a=1, −0.2<x≤0.2, and −0.1≤b≤0.1, and M contains at least one element selected from the group consisting of Ni, Co, Mn, and Al). In particular, when a lithium transition metal oxide containing Ni that readily reacts with moisture in the air is used, the degradation of the charge capacity due to air exposure is highly suppressed. The molar ratio of Ni in M is preferably 30% or more and more preferably 50% or more.

In particular, when a lithium transition metal oxide containing $Ni^{3+}$ that particularly readily reacts with moisture in the air is used, the degradation of the charge capacity due to air exposure is considerably suppressed. In the case of lithium-nickel-cobalt-manganese oxide, the compound containing $Ni^{3+}$ satisfies Ni>Mn on a molar basis. A lithium-nickel-cobalt-manganese oxide having a publicly known composition can be used. For example, the molar ratio of nickel, cobalt, and manganese is 5:2:3, 5:3:2, 6:2:2, 7:1:2, 7:2:1, or 8:1:1. Alternatively, a lithium-nickel-cobalt-aluminum oxide having a publicly known composition can be used. For example, the molar ratio of nickel, cobalt, and aluminum is 80:15:5, 85:12:3, or 90:7:3.

Furthermore, by mixing a phosphate compound in the positive electrode, the adsorption of moisture present in the air to the lithium transition metal oxide can be further suppressed.

The detailed mechanism is still unclear. However, the presence of the phosphate compound on at least a part of the surface of the tungsten oxide is believed to facilitate the adsorption of moisture at the interface between the tungsten oxide and the carbonate compound mixed in the positive electrode. Consequently, the degradation of the initial charge characteristics due to air exposure can be considerably suppressed.

The phosphate compound is present on the surface of the tungsten oxide that is present on at least a part of the surface of the lithium transition metal oxide. A strong interaction is generated between the phosphate compound, the tungsten oxide, and the carbonate compound mixed in the positive electrode, which facilitates the adsorption of moisture in the air and increases the amount of moisture adsorbed. Thus, the LiOH production reaction on the surface of the lithium transition metal oxide can be further suppressed.

The phosphate compound contained in the positive electrode is not particularly limited, and is preferably lithium phosphate, lithium dihydrogen phosphate, cobalt phosphate, nickel phosphate, manganese phosphate, potassium phosphate, or ammonium dihydrogen phosphate. Among them, lithium phosphate is particularly preferred. When such a phosphate compound is used, the degradation of the initial charge capacity due to air exposure is further suppressed.

The content of the phosphate compound is preferably 0.01 mass % or more and 1.5 mass % or less, more preferably 0.02 mass % or more and 1.2 mass % or less, and further preferably 0.1 mass % or more and 1.0 mass % or less relative to the total mass of the lithium transition metal oxide in terms of phosphorus.

If the content is less than 0.01 mass %, the synergistic effect produced by the tungsten oxide and the carbonate compound and phosphate compound mixed in the positive electrode decreases, which sometimes fails to suppress the degradation of the characteristics due to air exposure of electrode plates. If the content is more than 1.5 mass %, the amount of the positive electrode active material decreases by the excess amount of the phosphate compound, which decreases the capacity of the positive electrode.

The positive electrode containing a phosphate compound is produced by a method in which the lithium transition metal composite oxide and a phosphate compound are caused to adhere to each other by being mechanically mixed in advance or a method in which a phosphate compound is added in the process of kneading a conductive agent and a binding agent.

The particle size of the phosphate compound is preferably smaller than the particle size of the lithium transition metal oxide and more preferably smaller than or equal to 25% of the particle size of the lithium transition metal oxide. The particle size of the phosphate compound is determined as follows.

One hundred particles of the phosphate compound observed with a scanning electron microscope (SEM) are randomly sampled. The lengths of the major axis and minor axis of the particles are measured, and the average of the lengths is defined as the particle size of the phosphate compound. In the case where the phosphate compound is present in the form of an aggregate, the particle size is a particle size of particles which are the smallest unit for the aggregate.

If the particle size of the phosphate compound is larger than the particle size of the lithium transition metal oxide, the phosphate compound is poorly dispersed in the positive electrode, which decreases the contact area between the phosphate compound and the tungsten oxide. Consequently, the interface between the tungsten oxide and the phosphate compound is not sufficiently formed, which decreases the synergistic effect of the tungsten oxide and the carbonate compound and phosphate compound mixed in the positive electrode. Thus, the LiOH production reaction caused by moisture in the air easily occurs on the surface of the lithium transition metal oxide. Consequently, the effect of suppressing the degradation of the charge capacity decreases.

[Negative Electrode]

The negative electrode may be a known negative electrode and is produced by, for example, mixing a negative electrode active material and a binding agent with water or an appropriate solvent, applying the resulting mixture to a negative electrode current collector, and drying and rolling the negative electrode current collector. The negative electrode current collector is suitably formed of, for example, a conductive thin film such as a metal foil or alloy foil of copper or the like which is stable in the potential range of a negative electrode or a film including a metal surface layer made of copper or the like. The binding agent may be, for example, polytetrafluoroethylene (PTFE) as in the case of the positive electrode, but is preferably a styrene-butadiene copolymer (SBR) or a modified product thereof. The binding agent may be used together with a thickener such as carboxymethyl cellulose (CMC).

Any negative electrode active material capable of reversibly intercalating and deintercalating lithium ions can be used. Examples of the negative electrode active material include carbon materials, metals such as Si and Sn and alloy materials that form alloys with lithium, and metal composite oxides. These negative electrode active materials may be used alone or in combination of two or more.

[Nonaqueous Electrolyte]

The solvent of the nonaqueous electrolyte may be a known solvent. Examples of the solvent include cyclic carbonates such as ethylene carbonate, propylene carbonate, butylene carbonate, and vinylene carbonate; and chain carbonates such as dimethyl carbonate, methyl ethyl carbonate, and diethyl carbonate. In particular, a mixed solvent of the cyclic carbonate and the chain carbonate is preferably used as a nonaqueous solvent having a high lithium ion conductivity from the viewpoint of high dielectric constant, low viscosity, and low melting point. The volume ratio of the cyclic carbonate and the chain carbonate in the mixed solvent is preferably controlled to the range of 2:8 to 5:5.

Examples of compounds that can be used together with the above solvent include ester-containing compounds such as methyl acetate, ethyl acetate, propyl acetate, methyl propionate, ethyl propionate, and γ-butyrolactone; sulfone-containing compounds such as propane sultone; ether-containing compounds such as 1,2-dimethoxyethane, 1,2-diethoxyethane, tetrahydrofuran, 1,3-dioxane, 1,4-dioxane, and 2-methyltetrahydrofuran; nitrile-containing compounds such as butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile; and amide-containing compounds such as dimethylformamide. Furthermore, solvents obtained by replacing some of hydrogen atoms H of the above solvents with fluorine atoms F can also be used.

The solute of the nonaqueous electrolyte may be a known solute. Examples of the solute include fluorine-containing lithium salts such as $LiPF_6/LiBF_4/LiCF_3SO_3$, $LiN(FSO_2)_2$, $LiN(CF_3SO_2)_2$, $LiN(C_2F_5SO_2)_2$, $LiN(CF_3SO_2)(C_4F_9SO_2)$, $LiC(C_2F_5SO_2)_3$, and LiAsFg. Furthermore, a lithium salt [a lithium salt containing at least one of P, B, O, S, N, and Cl (e.g., $LiClO_4$)] other than the fluorine-containing lithium salt may be added to the fluorine-containing lithium salt. In particular, the fluorine-containing lithium salt and a lithium salt containing an oxalate complex as an anion are preferably mixed from the viewpoint of forming a stable coating film on the surface of the negative electrode in a high-temperature environment.

Examples of the lithium salt containing an oxalate complex as an anion include LiBOB [lithium bis(oxalate)borate], $Li[B(C_2O_4)F_2]$, $Li[P(C_2O_4)F_4]$, and $Li[P(C_2O_4)_2F_2]$. In particular, LiBOB capable of forming a stable coating film on the negative electrode is preferably used.

These solutes may be used alone or in combination of two or more.

[Separator]

A known separator may be used. Examples of the separator include polypropylene separators, polyethylene separators, polypropylene-polyethylene multilayer separators, and separators whose surface is coated with a resin such as an aramid resin.

A layer formed of a known inorganic filler may be formed at an interface between the positive electrode and the separator or at an interface between the negative electrode and the separator. Examples of the filler include known oxides and phosphates containing one or more elements such as titanium, aluminum, silicon, and magnesium; and those obtained by surface-treating the oxides and phosphates with a hydroxide or the like. The filler layer may be formed by, for example, directly applying a filler-containing slurry to the positive electrode, the negative electrode, or the separator, or pasting a sheet formed of the filler on the positive electrode, the negative electrode, or the separator.

EXAMPLES

Hereafter, the embodiment of the present invention will be further described in detail based on Experimental Examples. Experimental Examples below are merely examples for describing the positive electrode for nonaqueous electrolyte secondary batteries, the nonaqueous electrolyte secondary battery, and the positive electrode active material for nonaqueous electrolyte secondary batteries to embody the technical idea of the present invention. The present invention is not limited to Experimental Examples below and can be appropriately modified without changing the spirit of the present invention.

First Experimental Example

Experimental Example 1

[Production of Positive Electrode Active Material]

First, a nickel-cobalt-manganese composite hydroxide obtained by coprecipitation and represented by $[Ni_{0.50}Co_{0.20}Mn_{0.30}](OH)_2$ was fired at 500° C. to obtain a nickel-cobalt-manganese composite oxide. Then, lithium hydroxide and the obtained nickel-cobalt-manganese composite oxide were mixed with each other using an Ishikawa grinding mixer so that the molar ratio of lithium and all transition metals was 1.15:1.

The resulting mixture was then fired in an air atmosphere at 900° C. for 10 hours and pulverized to obtain positive electrode active material particles that had a particle size of 8 μm, contained, as a main component, a lithium-nickel-cobalt-manganese composite oxide represented by $Li_{1.07}[Ni_{0.465}Co_{0.186}Mn_{0.279}]O_2$, and included an inevitably produced lithium carbonate on the surfaces thereof. The amount of the lithium carbonate produced on the surface of the lithium-nickel-cobalt-manganese composite oxide was 0.15 wt % relative to the lithium-nickel-cobalt-manganese composite oxide.

[Production of Positive Electrode Plate]

The positive electrode active material, carbon black serving as a conductive agent, and an N-methyl-2-pyrrolidone solution prepared by dissolving polyvinylidene fluoride serving as a binding agent were weighed so that the mass ratio of the positive electrode active material, the conductive agent, and the binding agent was 92:5:3. They were kneaded to prepare a positive electrode mixture slurry. Subsequently, the positive electrode mixture slurry was applied onto both surfaces of a positive electrode current-collector formed of an aluminum foil, dried, and then rolled with a reduction roller. An aluminum current collecting tab was attached thereto to produce a positive electrode plate including positive electrode mixture layers formed on both surfaces of the positive electrode current collector.

Figure 1:
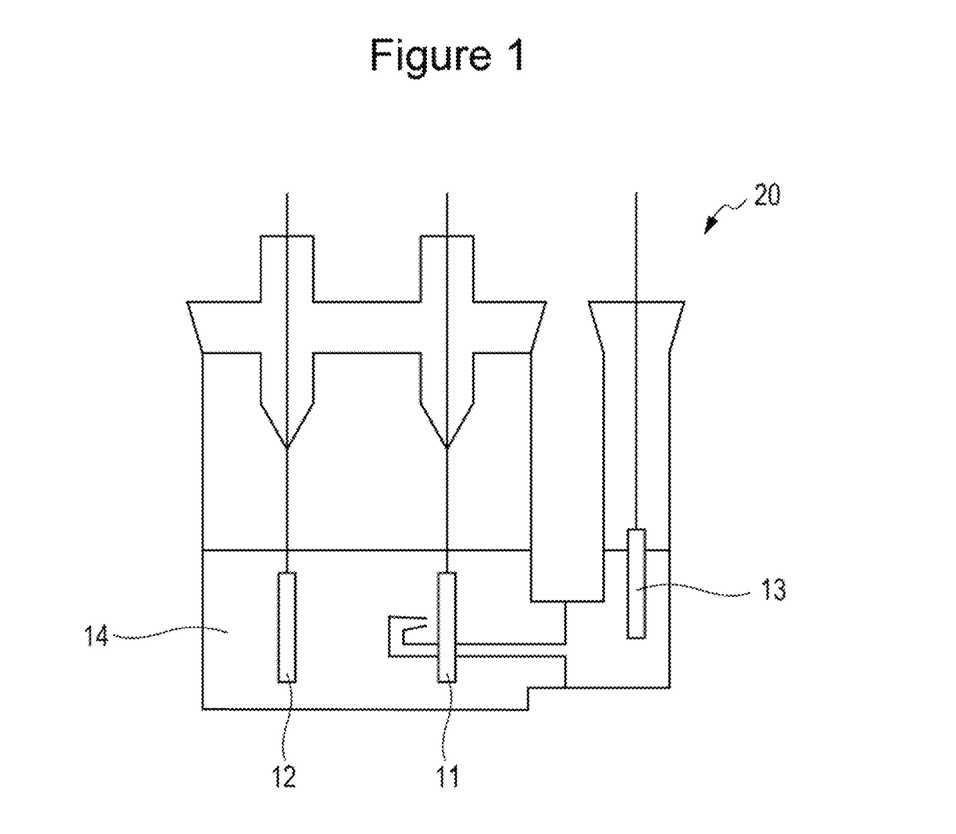
FIG. 1 schematically illustrates a three-electrode test cell used in Experimental Examples.

As illustrated in FIG. 1, a three-electrode test cell 20 was produced using the produced positive electrode as a working electrode 11 and metal lithium as a counter electrode 12 serving as a negative electrode and a reference electrode 13. A nonaqueous electrolytic solution 14 was prepared by dissolving $LiPF_6$ in a mixed solvent prepared by mixing ethylene carbonate, methyl ethyl carbonate, and dimethyl carbonate at a volume ratio of 3:3:4 so that the concentration of $LiPF_6$ was 1 mol/l, and then by dissolving 1 mass % of vinylene carbonate therein. The thus-produced battery is hereafter referred to as a battery A1.

[Production of Battery that Uses Positive Electrode Plate Exposed to Air]

A battery (battery B1) using a positive electrode plate exposed to the air was produced in the same manner as in the battery A1, except that the positive electrode plate was rolled with a reduction roller and then exposed to the air under the following conditions in the production thereof.

Air Exposure Conditions

The positive electrode plate was left to stand in a thermo-hygrostat at 60° C. and 50% for 3 days.

Experimental Example 2

A three-electrode test cell was produced in the same manner as in Experimental Example 1, except that $WO_3$ was mixed in the positive electrode active material particles made of $Li_{1.07}[Ni_{0.465}Co_{0.186}Mn_{0.279}]O_2$ in the production of the positive electrode active material. The thus-produced battery is hereafter referred to as a battery A2.

The content of the tungsten oxide in the thus-produced positive electrode active material was 1.0 mol % relative to the total content of metals other than lithium of the lithium-nickel-cobalt-manganese composite oxide represented by $Li_{1.07}[Ni_{0.465}Co_{0.186}Mn_{0.279}]O_2$.

A battery (battery B2) using a positive electrode plate exposed to the air was produced in the same manner as in the battery A2, except that the positive electrode plate was rolled with a reduction roller and then exposed to the air under the above conditions in the production thereof.

Experimental Example 3

A three-electrode test cell was produced in the same manner as in Experimental Example 1, except that lithium carbonate was mixed in the positive electrode active material particles mainly made of $Li_{1.07}[Ni_{0.465}Co_{0.186}Mn_{0.279}]O_2$ in the production of the positive electrode active material. The thus-produced battery is hereafter referred to as a battery A3.

The content of the lithium carbonate in the thus-produced positive electrode active material was 0.65 wt % relative to the lithium-nickel-cobalt-manganese composite oxide.

A battery (battery B3) using a positive electrode plate exposed to the air was produced in the same manner as in the battery A3, except that the positive electrode plate was rolled with a reduction roller and then exposed to the air under the above conditions in the production thereof.

Experimental Example 4

A three-electrode test cell was produced in the same manner as in Experimental Example 1, except that $WO_3$ was mixed in the positive electrode active material particles made of $Li_{1.07}[Ni_{0.465}Co_{0.186}Mn_{0.279}]O_2$ and then lithium carbonate was mixed therein in the production of the positive electrode active material. The thus-produced battery is hereafter referred to as a battery A4.

The content of the tungsten oxide in the thus-produced positive electrode active material was 1.0 mol % relative to the total content of metals other than lithium of the lithium-nickel-cobalt-manganese composite oxide represented by $Li_{1.07}[Ni_{0.465}Co_{0.186}Mn_{0.279}]O_2$. The content of the lithium carbonate in the positive electrode active material was 0.65 wt % relative to the lithium-nickel-cobalt-manganese composite oxide.

Figure 2A:
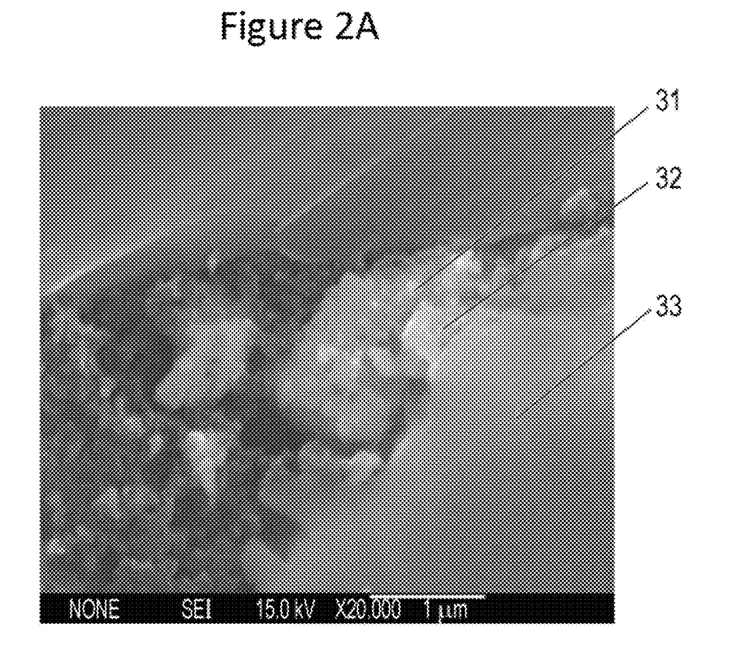
FIG. 2A is a SEM observation image of a positive electrode plate in Experimental Example 4 and FIG. 2B is a conceptual diagram of a SEM micrograph of the positive electrode plate in Experimental Example 4.
Figure 2B:
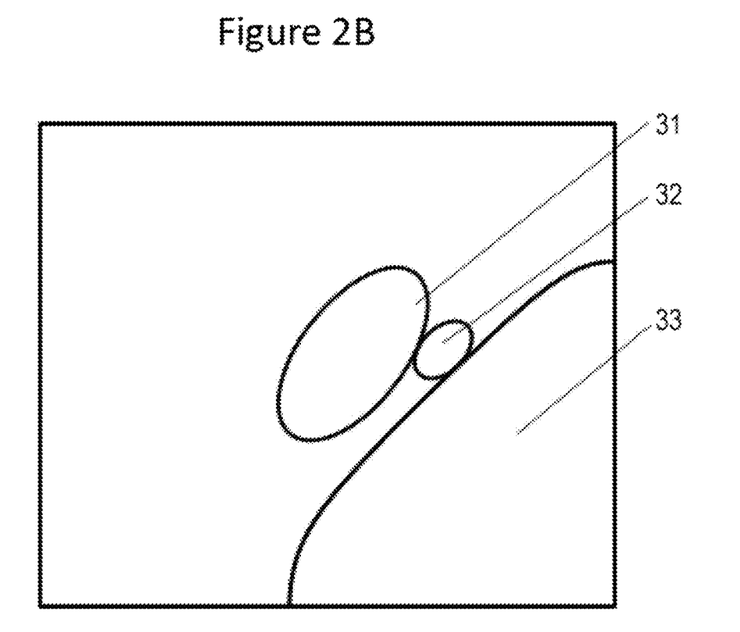

The produced positive electrode plate was observed with a scanning electron microscope (SEM). As illustrated in FIGS. 2A and 2B, there were observed an aggregate of a tungsten oxide 32 that adhered to the surface of the lithium-nickel-cobalt-manganese composite oxide 33 and had a particle size of 300 mn and an aggregate of a lithium carbonate 31 that adhered to the aggregate of the tungsten oxide 32 and had a particle size of 500 nm.

A battery (battery B4) using a positive electrode plate exposed to the air was produced in the same manner as in the battery A4, except that the positive electrode plate was rolled with a reduction roller and then exposed to the air under the above conditions in the production thereof.

Experimental Example 5

A three-electrode test cell was produced in the same manner as in Experimental Example 4, except that after the mixing of the lithium carbonate, lithium phosphate was further mixed in the positive electrode active material particles made of $Li_{1.07}[Ni_{0.465}Co_{0.186}Mn_{0.279}]O_2$ in the production of the positive electrode active material. The thus-produced battery is hereafter referred to as a battery A5.

The content of the tungsten oxide in the thus-produced positive electrode active material was 1.0 mol % relative to the total content of metals other than lithium of the lithium-nickel-cobalt-manganese composite oxide represented by $Li_{1.07}[Ni_{0.465}Co_{0.186}Mn_{0.279}]O_2$. The contents of the lithium carbonate and the lithium phosphate in the positive electrode active material were 0.65 wt % and 0.5 wt % relative to the lithium-nickel-cobalt-manganese composite oxide, respectively.

The produced positive electrode plate was observed with a scanning electron microscope (SEM). There were observed a tungsten oxide that adhered to the surface of the lithium-nickel-cobalt-manganese composite oxide and had a particle size of 300 nm, lithium carbonate particles that adhered to the tungsten oxide and had a particle size of 500 nm, and lithium phosphate that adhered to the tungsten oxide and had a particle size of 500 nm.

A battery (battery B5) using a positive electrode plate exposed to the air was produced in the same manner as in the battery A5, except that the positive electrode plate was rolled with a reduction roller and then exposed to the air under the above conditions in the production thereof.

<Charge Conditions>

Constant current charge was performed at a current-density of 0.2 $mA/cm^2$ at 25° C. until the voltage reached 4.3 V (vs. $Li/Li^+$). Constant voltage charge was performed at a constant voltage of 4.3 V (vs. $Li/Li^+$) at 25° C. until the current density reached 0.04 $mA/cm^2$ to measure the initial charge capacity.

<Calculation of Charge Capacity Degradation Percentage Due to Air Exposure>

Among the determined initial charge capacities, the initial charge capacity of the batteries without air exposure (the positive electrode plate was not exposed to the air) was defined as an "initial charge capacity without exposure", and the initial charge capacity of the batteries with air exposure (the positive electrode plate was exposed to the air) was defined as an "initial charge capacity with exposure". The charge capacity degraded due to air exposure was calculated from the difference between the initial charge capacity without exposure and the initial charge capacity with exposure of the corresponding battery on the basis of the formula (1) below.

Assuming that the charge capacity degradation percentage due to air exposure in Experimental Example 1 in which neither the tungsten oxide nor the lithium carbonate was mixed was "100", the charge capacity degradation percentage due to air exposure in each of Experimental Examples was determined. Table 1 collectively shows the results.

Charge capacity degraded due to air exposure=Initial charge capacity without exposure−Initial charge capacity with exposure  (1)

TABLE 1

| Composition | WO$_3$ in positive electrode mixture (mol %) | Li$_2$CO$_3$ on surface of active material (wt %) | Li$_2$CO$_3$ in portion other than surface of active material (wt %) | Li$_3$PO$_4$ in positive electrode mixture (wt %) | Charge capacity degradation percentage due to air exposure (%) |
|---|---|---|---|---|---|
| Experimental Example 1 | Li$_{1.07}$Ni$_{0.465}$Co$_{0.186}$Mn$_{0.279}$O$_2$ | — | 0.15 | — | — | 100 |
| Experimental Example 2 | Li$_{1.07}$Ni$_{0.465}$Co$_{0.186}$Mn$_{0.279}$O$_2$ | 1.0 | 0.15 | — | — | 83 |
| Experimental Example 3 | Li$_{1.07}$Ni$_{0.465}$Co$_{0.186}$Mn$_{0.279}$O$_2$ | — | 0.15 | 0.5 | — | 103 |
| Experimental Example 4 | Li$_{1.07}$Ni$_{0.465}$Co$_{0.186}$Mn$_{0.279}$O$_2$ | 1.0 | 0.15 | 0.5 | — | 41 |
| Experimental Example 5 | Li$_{1.07}$Ni$_{0.465}$Co$_{0.186}$Mn$_{0.279}$O$_2$ | 1.0 | 0.15 | 0.5 | 0.5 | 10 |

As is clear from the results in Table 1, in the batteries of Experimental Examples 4 and 5 in which a tungsten oxide that adhered to the surface of the lithium-nickel-cobalt-manganese composite oxide and a lithium carbonate that adhered to the tungsten oxide were observed, the charge capacity degradation percentage due to air exposure was highly improved compared with the batteries of Experimental Examples 1 to 3. In particular, the degradation percentage was considerably improved in the battery of Experimental Example 5 in which the lithium carbonate, the tungsten oxide, and the lithium phosphate were added.

The battery of Experimental Example 3 in which only the lithium carbonate was mixed and the battery of Experimental Example 1 in which no compounds were mixed had substantially the same charge capacity degradation percentage. The battery of Experimental Example 3 had no effect of suppressing the degradation of the charge capacity.

In the battery of Experimental Example 2 in which only the tungsten oxide was mixed, the charge capacity degradation percentage was improved compared with the battery of Experimental Example 1.

The reason for such results is believed to be as follows.

When tungsten oxide and a carbonate compound are mixed in the lithium-nickel-cobalt-manganese composite oxide, a tungsten oxide present in at least a part of the lithium-nickel-cobalt-manganese composite oxide and the mixed carbonate compound contact each other and thus an interface is formed.

Since the mixed lithium carbonate is located away from the surface of the lithium-nickel-cobalt-manganese composite oxide, the interface is also located away from near the surface of the lithium-nickel-cobalt-manganese composite oxide. Consequently, moisture that has adsorbed to the interface and Li present in a surface layer of the lithium-nickel-cobalt-manganese composite oxide do not easily cause the LiOH production reaction. Thus, a large effect of suppressing the degradation of the charge capacity is produced.

In the battery of Experimental Example 3 in which the tungsten oxide is not mixed, such an interface between the tungsten oxide and the lithium carbonate is not formed, and thus moisture in the air reacts with the surface of the lithium transition oxide as in the battery of Experimental Example 1. Therefore, the charge capacity degradation percentage due to air exposure is not improved.

In the battery of Experimental Example 2 in which only the tungsten oxide is mixed, the lithium carbonate is present on the surface of the lithium-nickel-cobalt-manganese composite oxide. Therefore, the interface is located near the surface of the lithium-nickel-cobalt-manganese composite oxide, and moisture that has adsorbed to the interface readily causes a substitution reaction of Li and hydrogen. Consequently, the LiOH production reaction occurs, and thus the degradation of the charge capacity is not sufficiently suppressed.

Second Experimental Example

Experimental Example 6

First, a nickel-cobalt-manganese composite hydroxide obtained by coprecipitation and represented by [Ni$_{0.5}$Co$_{0.20}$Mn$_{0.30}$](OH)$_2$ was fired at 500° C. to obtain a nickel-cobalt-manganese composite oxide. Then, lithium hydroxide and the obtained nickel-cobalt-manganese composite oxide were mixed with each other using an Ishikawa grinding mixer so that the molar ratio of lithium and all transition metals was 1.2:1.

The resulting mixture was then fired in an air atmosphere at 850° C. for 10 hours and pulverized to obtain a lithium-nickel-cobalt-manganese composite oxide having a particle size of 4 μm and represented by Li$_{1.07}$[Ni$_{0.465}$Co$_{0.186}$Mn$_{0.279}$]O$_2$. A three-electrode test cell was produced in the same manner as in Experimental Example 1, except that the positive electrode active material particles obtained in Experimental Example 6 and made of Li$_{1.07}$[Ni$_{0.465}$Co$_{0.186}$Mn$_{0.279}$]O$_2$ were used. The thus-produced battery is hereafter referred to as a battery A6.

The amount of the lithium carbonate produced on the surface of the thus-produced lithium-nickel-cobalt-manganese composite oxide was 0.57 wt % relative to the lithium-nickel-cobalt-manganese composite oxide.

A battery (battery 36) using a positive electrode plate exposed to the air was produced in the same manner as in the battery A6, except that the positive electrode plate was rolled with a reduction roller and then exposed to the air under the above conditions in the production thereof.

Experimental Example 7

A three-electrode test cell was produced in the same manner as in Experimental Example 6, except that only WO$_3$ was mixed in the Li$_{1.07}$[Ni$_{0.465}$Co$_{0.186}$Mn$_{0.279}$]O$_2$ in the production of the positive electrode active material. The thus-produced battery is hereafter referred to as a battery A7.

The content of the tungsten oxide in the thus-produced positive electrode active material was 1.0 mol % relative to the total content of metals other than lithium of the lithium-nickel-cobalt-manganese composite oxide represented by $Li_{1.07}[Ni_{0.465}Co_{0.186}Mn_{0.279}]O_2$.

A battery (battery B7) using a positive electrode plate exposed to the air was produced in the same manner as in the battery A7, except that the positive electrode plate was rolled with a reduction roller and then exposed to the air under the above conditions in the production thereof.

Experimental Example 8

A three-electrode test cell was produced in the same manner as in Experimental Example 6, except that lithium carbonate was mixed in the positive electrode active material particles made of $Li_{1.07}[Ni_{0.465}Co_{0.186}Mn_{0.279}]O_2$ in the production of the positive electrode active material. The thus-produced battery is hereafter referred to as a battery A8.

The content of the lithium carbonate in the thus-produced positive electrode active material was 1.07 wt % relative to the lithium-nickel-cobalt-manganese composite oxide represented by $Li_{1.07}[Ni_{0.465}Co_{0.186}Mn_{0.279}]O_2$.

A battery (battery B8) using a positive electrode plate exposed to the air was produced in the same manner as in the battery A8, except that the positive electrode plate was rolled with a reduction roller and then exposed to the air under the above conditions in the production thereof.

Experimental Example 9

A three-electrode test cell was produced in the same manner as in Experimental Example 6, except that after the mixing of $WO_3$, lithium carbonate was mixed in the $Li_{1.07}[Ni_{0.465}Co_{0.186}Mn_{0.279}]O_2$ in the production of the positive electrode active material. The thus-produced battery is hereafter referred to as a battery A9.

The content of the tungsten oxide in the thus-produced positive electrode active material was 1.0 mol % relative to the total content of metals other than lithium of the lithium-nickel-cobalt-manganese composite oxide represented by $Li_{1.07}[Ni_{0.465}Co_{0.186}Mn_{0.279}]O_2$. The content of the lithium carbonate in the positive electrode active material was 1.07 wt % relative to the lithium-nickel-cobalt-manganese composite oxide.

The produced positive electrode plate was observed with a scanning electron microscope (SEM). As in First Experimental Example, there were observed a tungsten oxide that adhered to the surface of the lithium transition metal oxide and had a particle size of 300 nm and lithium carbonate particles that adhered to the tungsten oxide but did not adhere to the surface of the lithium transition metal oxide and had a particle size of 500 nm.

A battery (battery B9) using a positive electrode plate exposed to the air was produced in the same manner as in the electricity A2, except that the positive electrode plate was rolled with a reduction roller and then exposed to the air under the above conditions in the production thereof.

Experimental Example 10

A three-electrode test cell was produced in the same manner as in Experimental Example 9, except that after the mixing of the lithium carbonate, lithium phosphate was further mixed in the $Li_{1.07}[Ni_{0.465}Co_{0.186}Mn_{0.279}]O_2$ in the production of the positive electrode active material. The thus-produced battery is hereafter referred to as a battery A10.

The content of the tungsten oxide in the thus-produced positive electrode active material was 1.0 mol % relative to the total content of metals other than lithium of the lithium-nickel-cobalt-manganese composite oxide represented by $Li_{1.07}[Ni_{0.465}Co_{0.186}Mn_{0.279}]O_2$. The contents of the lithium carbonate and the lithium phosphate in the positive electrode active material were 1.07 wt % and 0.5 wt % relative to the lithium-nickel-cobalt-manganese composite oxide, respectively.

A battery (battery B10) using a positive electrode plate exposed to the air was produced in the same manner as in the battery A10, except that the positive electrode plate was rolled with a reduction roller and then exposed to the air under the above conditions in the production thereof.

The charge capacity degradation percentage due to air exposure of these batteries was determined. Table 2 collectively shows the results.

TABLE 2

| | Composition | $WO_3$ in positive electrode mixture (mol %) | $Li_2CO_3$ on surface of active material (wt %) | $Li_2CO_3$ in portion other than surface of active material (wt %) | $Li_3PO_4$ in positive electrode mixture (wt %) | Charge capacity degradation percentage due to air exposure (%) |
|---|---|---|---|---|---|---|
| Experimental Example 6 | $Li_{1.07}Ni_{0.465}Co_{0.186}Mn_{0.279}O_2$ | — | 0.57 | — | — | 100 |
| Experimental Example 7 | $Li_{1.07}Ni_{0.465}Co_{0.186}Mn_{0.279}O_2$ | 1.0 | 0.57 | — | — | 92 |
| Experimental Example 8 | $Li_{1.07}Ni_{0.465}Co_{0.186}Mn_{0.279}O_2$ | — | 0.57 | 0.5 | — | 101 |
| Experimental Example 9 | $Li_{1.07}Ni_{0.465}Co_{0.186}Mn_{0.279}O_2$ | 1.0 | 0.57 | 0.5 | — | 57 |
| Experimental Example 10 | $Li_{1.07}Ni_{0.465}Co_{0.186}Mn_{0.279}O_2$ | 1.0 | 0.57 | 0.5 | 0.5 | 20 |

As is clear from the results in Table 2, in the batteries of Experimental Examples 9 and 10 in which lithium carbonate and tungsten oxide were mixed, the charge capacity degradation percentage due to air exposure was highly improved compared with the batteries of Experimental Examples 6 to 8, In particular, the degradation percentage was considerably improved in the battery of Experimental Example 10 in which the lithium carbonate, the tungsten oxide, and the lithium phosphate were added.

The battery of Experimental Example 8 in which only lithium carbonate was mixed and the battery of Experimental Example 6 in which no compounds were mixed had substantially the same charge capacity degradation percentage. The battery of Experimental Example 8 had no effect of suppressing the degradation of the charge capacity.

In the battery of Experimental Example 7 in which only tungsten oxide was mixed, the charge capacity degradation percentage was improved compared with the battery of Experimental Example 6.

As a result of the comparison between the battery of Experimental Example 4 and the battery of Experimental Example 7 that had almost the same content of the lithium carbonate in the positive electrode, that is, 0.65 wt % and 0.57 wt %, respectively, the charge capacity degradation percentage was considerably improved in the battery of Example 4 in which a larger amount of lithium carbonate was mixed.

The reason for this is believed to be as follows. The interface between the mixed lithium carbonate and the tungsten oxide to which moisture in the air preferentially adsorbs is located away from near the surface of the lithium transition metal oxide, and thus the LiOH production reaction is suppressed on the surface of the lithium transition metal oxide. However, the interface between inevitable lithium carbonate present on the surface of the lithium transition metal oxide and the tungsten oxide is located near the surface of the lithium transition metal oxide, and thus the LiOH production reaction is not sufficiently suppressed.

Accordingly, the amount of lithium carbonate present on the surface of the lithium transition metal oxide is desirably as small as possible. The amount of lithium carbonate mixed is preferably 50 mass % or more and more preferably 75 mass % or more relative to the lithium carbonate contained in the positive electrode.

INDUSTRIAL APPLICABILITY

The positive electrode for nonaqueous electrolyte secondary batteries according to an aspect of the present invention and the nonaqueous electrolyte secondary battery that uses the positive electrode can be applied to driving power supplies for mobile information terminals, such as cellular phones, notebook computers, smart-phones, and tablet terminals, that are particularly required to have high energy density. They are also promising for high-output uses such as electric vehicles (EVs), hybrid electric vehicles (HEVs, PHEVs), and power tools.

REFERENCE SIGNS LIST 11 working electrode (positive electrode)
12 counter electrode (negative electrode)
13 reference electrode
14 nonaqueous electrolytic solution
20 three-electrode test cell
31 lithium carbonate
32 tungsten oxide
33 lithium-nickel-cobalt-manganese composite oxide

The invention claimed is:

1. A positive electrode for a nonaqueous electrolyte secondary battery, comprising a lithium transition metal oxide, wherein,
    a tungsten oxide is present on at least a part of a surface of the lithium transition metal oxide,
    a carbonate compound that exists in a portion other than the surface of the lithium transition metal oxide is present on a part of a surface of the tungsten oxide, and
    at least one interface between a particle of tungsten oxide and a particle of carbonate compound is not touching the lithium transition metal oxide.

2. The positive electrode for the nonaqueous electrolyte secondary battery according to claim 1, wherein a content of the carbonate compound is 0.5 mass % or more and 5 mass % or less relative to the lithium transition metal oxide.

3. The positive electrode for the nonaqueous electrolyte secondary battery according to claim 1, wherein the carbonate compound is lithium carbonate.

4. The positive electrode for the nonaqueous electrolyte secondary battery according to claim 3, wherein an amount of the lithium carbonate mixed is 50 mass % or more of an amount of lithium carbonate contained in the positive electrode.

5. The positive electrode for the nonaqueous electrolyte secondary battery according to claim 1, wherein the tungsten oxide is $WO_3$.

6. The positive electrode for the nonaqueous electrolyte secondary battery according to claim 1, wherein the lithium transition metal oxide is represented by a general formula $Li_{1+x}M_aO_{2+b}$, in the formula, x, a, and b satisfy $x+a=1$, $-0.2<x\leq0.2$, and $-0.1\leq b\leq0.1$, and M contains at least one element selected from the group consisting of Ni, Co, Mn, and Al.

7. The positive electrode for the nonaqueous electrolyte secondary battery according to claim 1, further comprising a phosphate compound.

8. The positive electrode for the nonaqueous electrolyte secondary battery according to claim 7, wherein the phosphate compound is present on the part of the surface of the tungsten oxide.

9. The positive electrode for the nonaqueous electrolyte secondary battery according to claim 7, wherein the phosphate compound is lithium phosphate.

10. A nonaqueous electrolyte secondary battery comprising the positive electrode for the nonaqueous electrolyte secondary battery according to claim 1.

* * * * *